Oct. 27, 1942.    G. M. ARGABRITE    2,299,725
METHOD FOR DRYING LEATHER
Original Filed Sept. 3, 1938    3 Sheets-Sheet 3

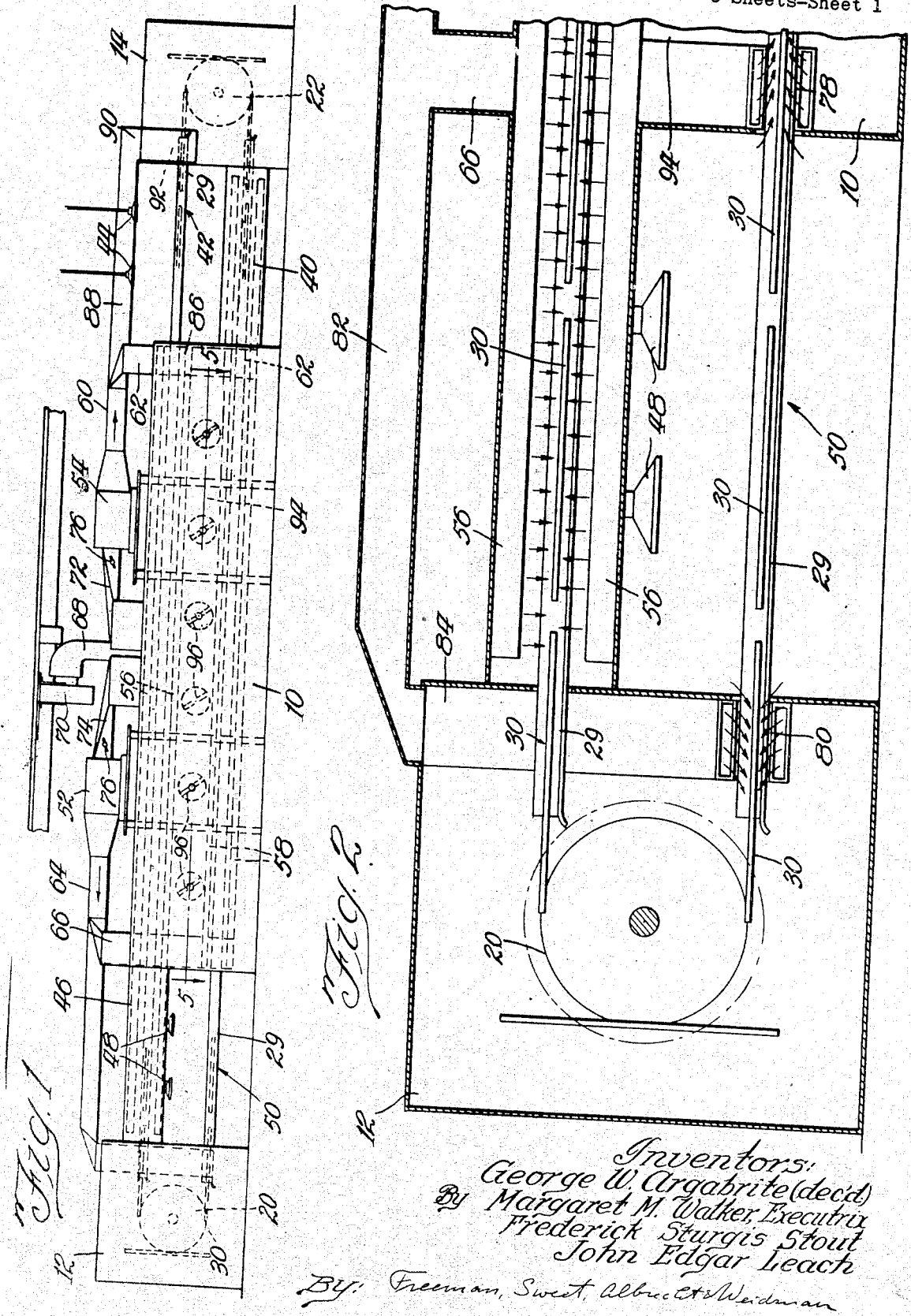

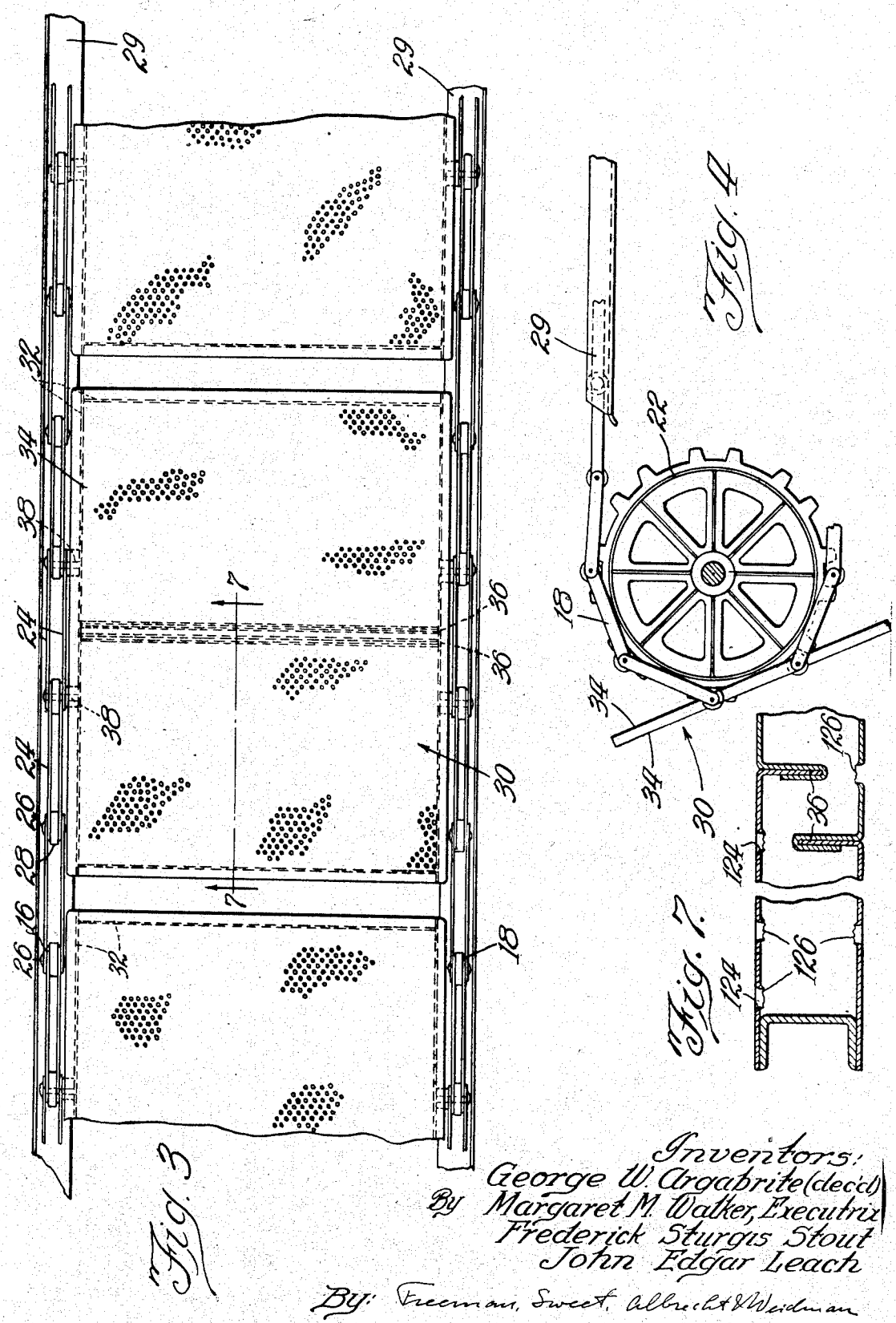

Inventors:
George W. Argabrite (dec'd)
By Margaret M. Walker, Executrix
Frederick Sturgis Stout
John Edgar Leach By: Freeman, Sweet, Albrecht & Weidman
ATTORNEYS Patented Oct. 27, 1942

2,299,725

UNITED STATES PATENT OFFICE 2,299,725

METHOD FOR DRYING LEATHER

George M. Argabrite, deceased, late of Chicago, Ill., by Margaret M. Walker, formerly Margaret M. Argabrite, executrix, Cheyenne, Wyo., and Frederick Sturgis Stout and John Edgar Leach, Camden, N. J.; said Margaret M. Walker, assignor to Wesley H. Argabrite, Des Plaines, Ill.

Original application September 3, 1938, Serial No. 228,422, now Patent No. 2,197,776, dated April 23, 1940. Divided and this application April 14, 1939, Serial No. 267,926

4 Claims. (Cl. 34—23)

The invention relates to the processing of leather and includes among its objects and advantages an improvement in the removal of moisture from wet leather, of a type particularly advantageous where the requirements include a high degree of uniformity of moisture distribution in the finished product, or a high time rate of output with relation to the working personnel employed, or both.

In the accompanying drawings:

Figure 1 is a side elevation of a drier according to the invention;

Figure 2 is an enlarged central section in a vertical plane of the left hand portion of the drier of Figure 1;

Figure 3 is a plan view of a portion of one of the horizontal reaches of the conveyor;

Figure 4 is an enlarged side elevation of a sprocket wheel at one end of the conveyor;

Figure 7 is a detail section on line 7—7 of Figure 3.

Housing and conveyor

Figure 5:
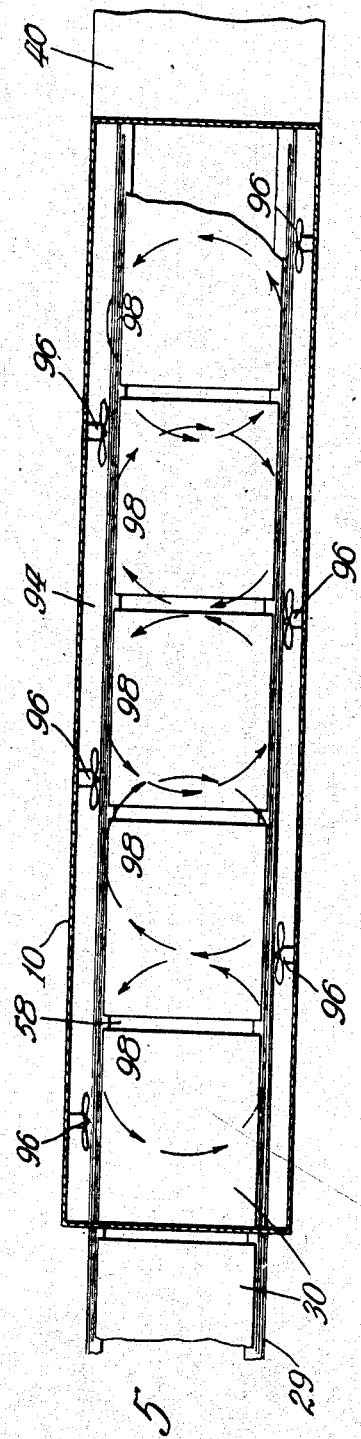
Figure 5 is a partial section as on line 5—5 of Figure 1.

In the embodiment of apparatus according to the invention selected for illustration, the drier comprises a main chamber 10 and end chambers 12 and 14. The conveyor comprises a pair of duplicate spaced endless chains 16 and 18 driven by sprocket wheels 20 and 22 from any suitable source of power (not shown). Each sprocket chain is made up of overlapping links 24 united by pivots 26 on which pivots are supporting rollers 28 between the links. Between the sprocket wheels 20 and 22 are provided tracks 29 on which the rollers 28 ride, so that the reaches of the conveyor are substantially horizontal instead of assuming a catenary curve. On the chains is supported an unbroken series of frames 30. Each frame, as indicated in Figure 3, has a rigid peripheral structure 32 of structural iron and a pair of foraminated plates 34 in closely spaced parallel planes, one above and one below the peripheral structure 32. As illustrated, the frames are of quite large size, and accordingly the plates 34 are each made up in two sections with the edges of the sections crimped over each other as indicated in Figure 3 at 36 to unite the sections. Each side of each frame carries two spaced pivots 38 equally spaced from the transverse center line of the frame and separated by a distance equal to the distance between two adjacent pivots 26. These pivots 38 are entered inside the pivots 26 so that the frame 30 as a whole moves and turns with the links 24 between the pivots 26 on which the frame is mounted. It will be apparent that, as clearly indicated in Figures 1 and 2, each frame 30 will travel in a horizontal position from one sprocket wheel to the other and then rotate around the center of rotation of the sprocket wheel through the vertical positions illustrated in Figure 2 back into a new horizontal position in the opposite reach of the conveyor, but with the other side of the frame uppermost.

At each end of the apparatus a length of the conveyor is exposed to permit workmen to remove dried kips or hides from the frames and replace them with wet kips or hides to be dried. In Figure 1 is illustrated a housing section 40 at the right hand end, which section is of reduced size and establishes communication between the housings 10 and 14 around the lower reach of the conveyor. But the corresponding portion 42 of the upper reach of the conveyor below the lights 44 which are provided to illuminate the working space, is exposed. Similarly, at the left hand end there is provided a reduced housing section 46 surrounding the upper reach of the conveyor and establishing communication between the chambers 10 and 12. The lights 48 are positioned below the housing section 46 to illuminate the exposed conveyor portion at 50.

Drying

To dry the leather as it passes through the housings two air heating and conditioning units 52 and 54 are provided from which warm air may be delivered. Above and below the upper reach of the conveyor throughout the extent of the housings 10 and 46, lie horizontal air ducts 56. The surfaces of these air ducts adjacent the conveyor are perforated so that warm air for drying flows out of them and into contact with the leather on the frames. Similar air ducts 58 are provided above and below the lower reach of the conveyor throughout the housings 10 and 40. The conditioning unit 54 delivers conditioned air through a horizontal duct 60 to a riser 62 which communicates with all four of the horizontal ducts 56 and 58, and the conditioning unit 52 delivers conditioned air to the horizontal duct 64 which in turn communicates with the riser 66, and the riser 66 also communicates with all four of the horizontal ducts 56 and 58. This is the main air supply for drying purposes.

The air thus discharged against the leather finds its way laterally to either side and rises along the sides of the chamber 10 and is withdrawn through the duct 68. Suitable means for maintaining the circulation is illustrated in the form of the exhaust fan 70.

Where the conditions of drying are such that the spent air is too heavily charged with moisture to be worth recirculating, all the air may be discharged at the outlet 68. However, under conditions where this air is still of some use, part or all of it may be recirculated, as by means of the return duct 72 leading from the discharge duct 68 to the air conditioning unit 54, and the return duct 74 leading from the discharge duct 68 to the air conditioning unit 52. In these return ducts dampers 76 are provided to control the amount of recirculation or to prevent any recirculation at all.

To avoid the discharge of heated air at the ends of the exposed conveyor portions 42 and 50, there is provided a small air box 78 indicated in Figure 2 adjacent the right hand end of the conveyor portion 50 and just inside the housing 10. The air discharged from the box 78 is directed laterally to the right so that a gentle suction is developed around the opening in the wall of the chamber 10 where the conveyor enters the chamber. This establishes a gentle suction around the opening which need not necessarily be sufficient to draw in any appreciable amount of outside air, but prevents the escape of any of the warm air in the chamber, which would not only represent a loss of drying power but inconvenience the workmen as well. The box 78 may secure its air supply from the riser 66. A similar box 80 at the left hand end of the exposed portion 50 may secure its air through an extension 82 of the duct 64 and a riser 84.

Similarly, as clearly indicated in Figure 1, a box 86 at the left end of the exposed portion 42 receives its air supply from the riser 62, and the extension 88 and riser 90 deliver air to the box 92 at the right hand end of the exposed portion 42.

Under many load conditions the movement of the air inside the large chamber 10, produced solely by the action of the inlet and outlet ducts, tends to be somewhat irregular and to exert a variable drying action on different portions of the conveyor. Within the horizontal clearance space indicated at 94 in Figures 1, 2, and 5, there is provided a series of small fans 96. As clearly indicated in Figure 5 these fans are staggered alternately near opposite side walls of the housing 10 and they set up a series of horizontal vortices 98 by means of which the rising air is thoroughly mixed and kept uniform in temperature and moisture content.

Operation

In one successful installation the speed of the conveyor is between two and three feet per minute and it takes substantially half an hour for a particular frame to complete the entire circuit. Each frame enters the exposed portion 42 with the hide on top completely dry and ready for removal and the hide on the bottom substantially half dry. At this point workmen standing beside the conveyor unfasten the hide from its supporting plate 34 and remove it and replace it with a new wet hide to be dried, in which condition the frame enters the main drier section 10. About fifteen minutes later this same frame will have rounded the sprocket 20 and will enter the exposed section 50 with the wet hide attached at the other end of the conveyor now on the underside of the frame and half dry, and the half dry hide that was on the underside of the frame at the other end of the conveyor on top and completely dried. Accordingly, the task of removing the dried hide on top and replacing it with a wet one as the frame passes through the exposed portion 50 is identical with the task performed by the workmen at 42. In the successful installation referred to, it is customary to have two workmen working at 42 and two others at 50, and these four men have substantially nothing to do but take off finished hides and put on wet ones, by means of the edge toggles common in the art, which enter openings in the foraminated plate 34 and pin the edge of the hide to the plate 34 around the periphery of the hide. It will be obvious that the frame may carry a single hide or piece of leather on each side, or a plurality of pieces, depending on the relative sizes of the pieces of leather and the frame.

Figure 6:
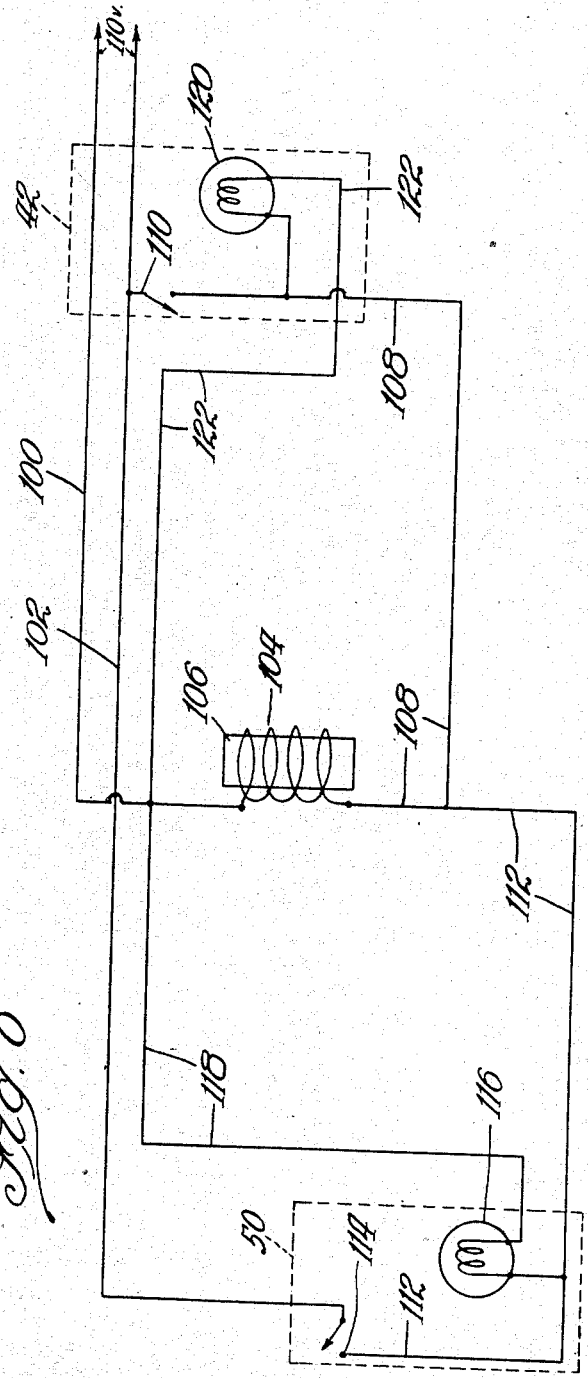
Figure 6 is a wiring diagram.

The speed stated is such as to keep the workmen substantially continuously employed in removing and replacing the hides. However, in case of any delay for any reason it is preferable to maintain full load on the drier and uniformity in the load throughout the drier by having a new wet hide on every entering frame, rather than allowing an occasional frame to go through empty. In Figure 6 is indicated the arrangement of wiring necessary to enable the workmen at 42 or the workmen at 50 to stop the movement of the conveyor momentarily in case they are not quite able to keep up with the work. The power lines 100 and 102 are supplied with electrical energy from a suitable source and the line 100 extends to the winding 104 of a solenoid 106 arranged to stop the motor which drives the sprocket wheels 20 and 22. From the other terminal of the winding 104 a conductor 108 extends to the control switch 110 by means of which the workmen at 42 can stop the motor. And another conductor 112 extends to the control switch 114 by means of which the workmen at 50 can stop the motor. Signal light 116 visible to the workmen at 50 is shunted across the winding 104 by means of a conductor 118, and signal light 120 is similarly shunted across the same winding 104 by means of the conductor 122. Thus when the workmen at either position find it necessary to interrupt the movement of the conveyor momentarily to catch up, both signal lights 116 and 120 will be lit so that the workmen at the other end of the conveyor will know that the interruption is caused by their team mates and not by any failure of power or shut down of the machine.

It will be obvious that the speed of the conveyor depends on the type of leather that the workmen are putting on, and on the number of pieces they put on each support. In operation, the speed is adjusted to keep the workmen comfortably busy changing leather, and then the hot air supply is adjusted to secure the desired dryness under those conditions of speed and load.

Referring now to Figure 7, the individual apertures in the plates 34 are indicated at 124, and it will be noted that around each aperture there remains a burr 126. It has been customary in the past to mount hides for drying on single sheets of metal. In such cases it is necessary to smooth the edges of such holes as 124 so that no sharp projections are left anywhere to scratch the leather or the workmen's fingers or both. The machining operations necessary to smooth the edges of such a large number of holes, represent a cost in excess of the cost of the metal for the plate, but a simple punching operation will form holes such as illustrated in Figure 7, with one side of the plate smooth and entirely suitable for immediate use. By using two spaced plates as shown, we not only obtain a substantial air space between the leather on opposite sides, which assists in making the drying action uniform on the different parts of each piece of leather, but we eliminate the heavy expense of smoothing and polishing the edges of the holes. And because of the large size of the supports and the additional structural strength resulting from spacing the plates apart, the total weight of metal in the finished support is not seriously increased. The final result is a support that has three advantages over the single plate; first, it is cheaper to produce; second, it is much more rigid but still not objectionably heavy; and third, it has the inside air space that equalizes the drying section.

This application is a division of co-pending application Serial Number 228,422, filed September 3, 1938, now Patent Number 2,197,776, of April 23, 1940.

Without further elaboration the foregoing will so fully explain the invention that others may, by applying knowledge current at the time of application, readily adapt the same for use under various conditions of service.

We claim:

1. The method of drying leather which comprises: affixing a wet piece of leather to one side of a support; subjecting the support and the leather on it to drying action until the leather is approximately half dried; affixing a second wet piece of leather to the opposite side of said support and drying the support and the leather on it until said first piece is completely dried and said second piece is approximately half dried; removing the completely dried piece of leather and replacing it with a wet piece and continuing the process through an indefinite number of cycles.

2. The method of drying leather which comprises, in combination: moving a series of perforate supports continuously in a closed path including two long horizontal reaches located one above the other, and two curved reaches interconnecting adjacent ends of said horizontal reaches; holding each support in the plane of each horizontal reach or substantially tangent to the adjacent portion of each curved reach throughout its movement, whereby each support passes through one of said horizontal reaches with one side uppermost and through the other reach with the other side uppermost; at a predetermined position of the movement of each support through each of said horizontal reaches, removing from the upper surface of said support dried leather carried thereby, and affixing wet leather to be dried; and subjecting said supports and the leather thereon to drying action, except at said predetermined positions for removal of dry leather and affixing of wet leather.

3. The method of drying leather which comprises, in combination: moving a series of perforate supports continuously in a closed path including two long horizontal reaches located one above the other, and two other reaches interconnecting adjacent ends of said horizontal reaches; holding each support in the plane of its path or substantially tangent to the adjacent curved portion of its path, throughout its movement, whereby each support passes through one of said horizontal reaches with one side uppermost and through the other reach with the other side uppermost; at a predetermined position of the movement of each support through each of said horizontal reaches, removing from the upper surface of said support dried leather carried thereby, and affixing wet leather to be dried; and subjecting said supports and the leather thereon to drying action, except at said predetermined positions for removal of dry leather and affixing of wet leather.

4. The method of drying leather which comprises, in combination: moving a series of supports continuously in a closed path including two long horizontal reaches located one above the other, and two other reaches inter-connecting adjacent ends of said horizontal reaches; holding each support in the plane of its path or substantially tangent to the adjacent curved portion of its path throughout its movement, whereby each support passes through one of said horizontal reaches with one side uppermost and through the other reach with the other side uppermost; at a predetermined position of the movement of each support through each of said horizontal reaches, removing from the upper surface of said support dried leather carried thereby, and affixing wet leather to be dried; and subjecting said supports and the leather thereon to drying action; said predetermined positions being approximately equally spaced along said closed path, whereby each piece of leather undergoes the first half of the drying process in close proximity to a dryer piece, and the last half of the drying process in close proximity to a wetter piece.

MARGARET M. WALKER,
*Formerly Margaret M. Argabrite, Widow and Executrix of the Estate of George M. Argabrite, Deceased.*

FREDERICK STURGIS STOUT.
JOHN EDGAR LEACH.